United States Patent [19]
Foster

[11] 3,714,536
[45] Jan. 30, 1973

[54] PUMP STROKE RATE AND MOTOR CONTROL

[75] Inventor: Arthur A. Foster, Mansfield, Ohio

[73] Assignee: The Gorman-Rupp Company, Mansfield, Ohio

[22] Filed: June 17, 1971

[21] Appl. No.: 154,041

[52] U.S. Cl. .................318/470, 318/364, 318/375
[51] Int. Cl. .............................................H02p 7/00
[58] Field of Search......318/264, 265, 369, 375, 443, 318/444, 470, DIG. 1, 341, 212, 379

[56] References Cited

UNITED STATES PATENTS

| | | | |
|---|---|---|---|
| 3,617,837 | 11/1971 | Beck | 318/212 |
| 3,368,134 | 2/1968 | Mead et al. | 318/341 X |
| 3,305,714 | 2/1967 | Plumpe | 318/212 |
| 3,582,747 | 6/1971 | Kearns | 318/379 |

Primary Examiner—Bernard A. Gilheany
Assistant Examiner—F. E. Bell
Attorney—Everett R. Hamilton et al.

[57] ABSTRACT

The repetition rate of the stroke of a positive displacement pump is regulated by controlling the current to a ramp generator in the form of a Schmitt trigger. The ramp generator energizes a flip flop which, through a triac, allows the AC motor of the pump to make one revolution whereupon a reed switch closes, changing the state of the flip flop and imposing a short burst of DC on the motor, effectively braking the same.

13 Claims, 1 Drawing Figure

PATENTED JAN 30 1973
3,714,536
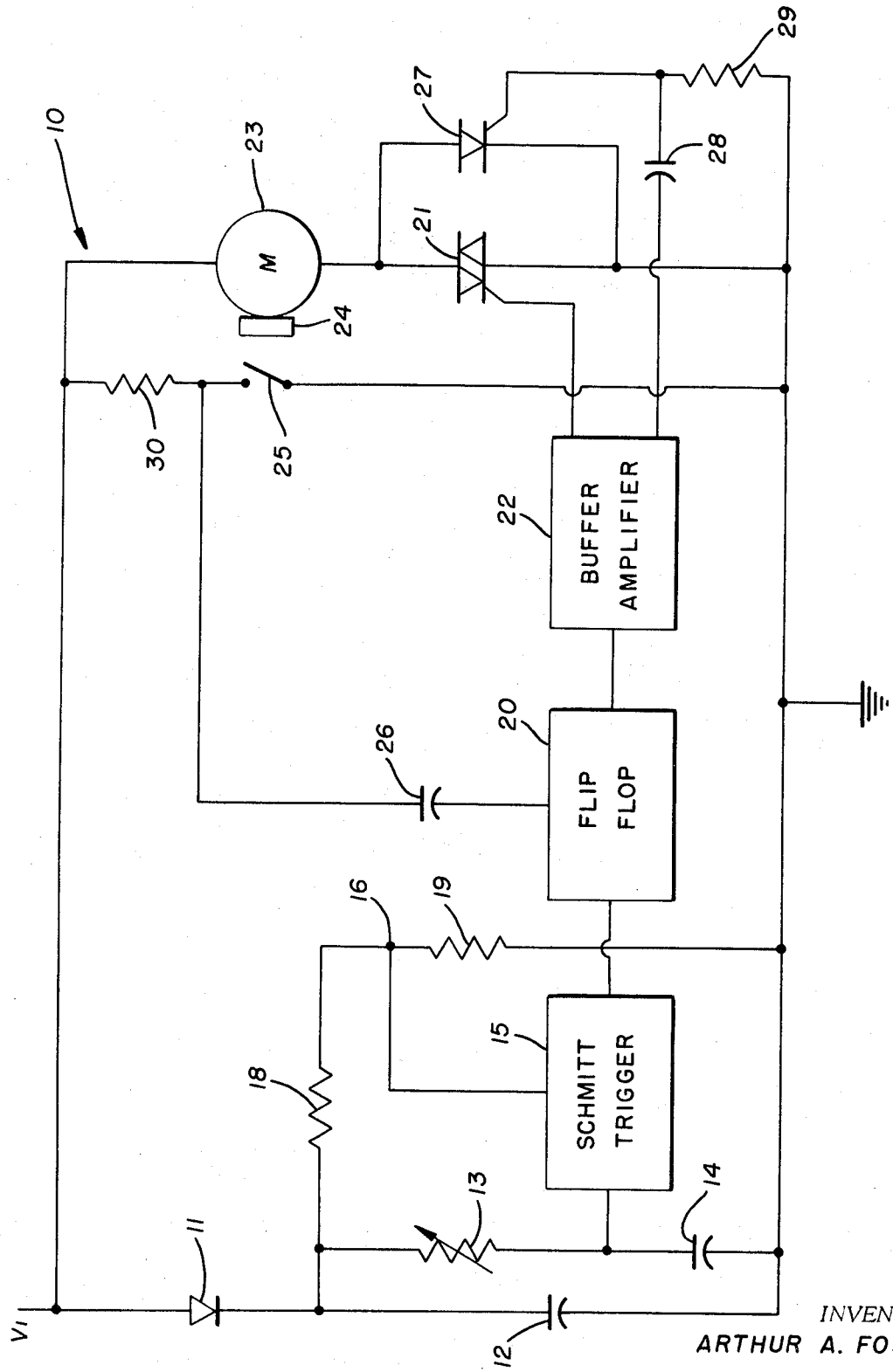
INVENTOR.
ARTHUR A. FOSTER

PUMP STROKE RATE AND MOTOR CONTROL

BACKGROUND OF THE INVENTION

This invention relates to an apparatus for controlling the repetition rate of the stroke of a positive displacement pump. Further, this invention relates to an apparatus which also controls the braking of the pump as the stroke is controlled.

The control of the repetition rate of the stroke of a positive displacement pump, such as that described in U.S. Pat. No. 3,529,908, has long been a problem which has plagued the pump art. In the past, the repetition rate could be varied by dismantling the motor and changing the gear ratio therein or by making various other changes of a mechanical nature. Other attempts at controlling the stroke rate have resulted in adversely affecting the power output of the drive motor and have, therefore, been undesirable. If a variable speed DC motor is utilized, the stroke rate may be controlled by varying the voltage thereto. However, such a device is severely influenced by the load to the extent that under a heavy load, for example, the motor may slow down and adversely affect accurate metering. While a feedback loop from the motor to the input controller may solve this problem, this becomes quite a costly procedure and is therefore impractical. In short, no method of remote, accurate and facile stroke control has, to my knowledge, been developed.

Inherent in controlling the repetition rate of the stroke is the stopping or braking of the motor between strokes, which has caused additional problems. While the braking function can be accomplished by means of a mechanical brake interlocked with the electrical system, at high frequency operations the mechanical brake becomes difficult to maintain.

SUMMARY OF THE INVENTION

Thus, it is a primary object of the present invention to provide an apparatus for remotely controlling the repetition rate of the stroke of a motor driven positive displacement pump.

It is another object of the present invention to provide an apparatus, as above, for controlling the stroke repetition rate without dismantling the motor.

It is still another object of the present invention to provide an apparatus, as above, for controlling the stroke repetition rate without changing the gear ratio of the motor.

It is yet another object of the present invention to provide an apparatus, as above, for controlling the stroke repetition rate without reducing the power output of the motor.

It is a further object of the present invention to provide an apparatus, as above, with an electronic brake.

It is a still further object of the present invention to provide an apparatus, as above, which is capable of operation at a high frequency for a long period of time.

It is yet another object of the present invention to provide an apparatus, as above, which will not be affected by fluctuations in line voltage.

These and other objects of the present invention which will become apparent from the following description are accomplished by improvements hereinafter described and claimed.

In general, a desired portion of current is drawn off from a conventional half-wave rectified voltage source by a variable resistor to activate a Schmitt trigger acting as a ramp generator. As the trigger discharges, a flip flop drives, through a triac, the AC motor of the pump causing the motor to move one revolution and thereby accomplishing one stroke of the pump. A magnet on the motor crank closes a reed switch at the end of each stroke to reverse the state of the flip flop which allows a voltage to pass through an SCR, in parallel with the triac, to the motor, thereby braking the motor with a short burst of DC.

BRIEF DESCRIPTION OF THE DRAWINGS

FIG. 1 is a block-schematic diagram of the pump stroke rate and motor control according to the concept of the present invention.

DESCRIPTION OF THE PREFERRED EMBODIMENT

The pump stroke rate and electronic motor control is indicated generally by the numeral 10 in the drawing and is powered by a conventional half-wave power supply consisting of a full-wave voltage source ($V_1$) presented to a diode 11 and capacitor 12, in a standard configuration.

A portion of current from the now rectified voltage $V_1$ is drawn off by a variable resistor 13 whose sliding contact is used to supply the charging current to capacitor 14 which drives a conventional ramp generator in the form of a Schmitt trigger circuit 15. Capacitor 14 is charged to the firing level of trigger 15 at a rate dependent on the setting of variable resistor 13. This firing level or operating voltage for the low voltage solid state elements in trigger 15 is maintained at point 16, voltage $V_1$ having been dropped by resistor 18. A resistor 19 holds the operating voltage at point 16 above ground. Of course, it should be evident that the operating voltage can be adjusted slightly by varying the size of resistors 18 and 19, as would be evident to one skilled in the art. As the trigger 15 discharges, the state of a bistable circuit such as a conventional flip flop 20 is changed to provide a signal to trigger an AC switch such as a triac 21 after passing through a conventional buffer amplifier 22. The buffer amplifier 22 serves to isolate flip flop 20 from the other circuit elements.

It should be noted that the repetition rate for the trigger 15 is essentially constant despite possible fluctuations in $V_1$. For example, any increase in $V_1$ tending to increase flow through variable resistor 13 and shorten the rise period of the trigger 15 will also produce an equivalent rise in the voltage at point 16, the firing level of the trigger. The net effect is that the more rapidly rising ramp must go farther before it can discharge so that the time to discharge is essentially constant and independent of $V_1$.

The triac 21 then allows full wave voltage from $V_1$ to be imposed on an AC inductive motor 23 to cause the motor to run. A magnet, shown schematically as 24, on the crank of the motor 23 is positioned so as to close a reed switch 25 at the desired stopping point in the cycle, for example, after one stroke of the pump. The closing of switch 25 sends a negative pulse through capacitor 26 to flip flop 20 which is thereby reset, cutting off the triac 21.

If it is desired to provide an electronic brake to prevent coating of the motor, the change in state of flip flop 20 may transiently turn on a conventional SCR 27 in parallel with the triac 21. The time constant of a capacitor 28, whose charge is held above ground by resistor 29, should be of such a value as to keep the SCR 27 conducting in its one direction for a transient activation time of, for example, seven half-waves of AC, which constitutes an application of DC to the motor 23 which will stall the motor, avoiding any drift thereof. A resistor 30 prevents the field of motor 23 from interfering with the next cycle of the motor operation as initiated by the Schmitt trigger 15.

Thus, it should be evident that by merely controlling the amount of current to the ramp generator in the form of Schmitt trigger 15, as by variable resistor 13, the pump cycle rate may be accurately controlled and the motor successfully braked by the short burst of DC, thereby substantially improving the pump motor control art.

What is claimed is:

1. An electronic control for a motor comprising power means, means generating a ramp signal, control means providing a selective portion of a signal from said power means to said means generating a ramp signal thereby controlling the rate of generation of the ramp signal, bistable circuit means triggered by said means generating a ramp signal, switch means operative upon the triggering of said bistable circuit means and allowing said power means to operate the motor, and means to reset said bistable circuit means in response to a predetermined position of the motor so that said switch means removes said power means from the motor.

2. An electronic control according to claim 1 further comprising means to brake the motor at a predetermined position of the motor.

3. An electronic control according to claim 2 further comprising buffer circuitry means isolating said bistable circuit means from said switch means and said means to brake the motor.

4. An electronic control according to claim 1 wherein said power means includes a source of alternating current to operate the motor and means to rectify said source of alternating current to supply a signal to said control means.

5. An electronic control according to claim 1 wherein said control means is a variable resistor.

6. An electronic control according to claim 1 wherein a capacitor is charged by said control means, and said means generating a ramp signal includes a Schmitt trigger fired by said capacitor.

7. An electronic control according to claim 1 wherein said bistable circuit means is a flip flop.

8. An electronic control according to claim 1 wherein said switch means is a triac.

9. An electronic control according to claim 1 wherein said means to reset said bistable circuit includes a second switch means, means located at a predetermined position of the motor to close said second switch means, and a capacitor which is discharged by the closing of said second switch means, the discharging of said capacitor resetting said bistable circuit means.

10. An electronic control according to claim 2 wherein said means to brake the motor includes a second switch means in parallel with said switch means allowing a rectified portion of the signal from said power means to be imposed on the motor, and a capacitor, said capacitor being charged by a signal from said bistable circuit means after said bistable circuit means has been reset and having a time constant which dictates the duration of the application of said power means to the motor.

11. An electronic control according to claim 10 wherein said second switch means is an SCR which will only allow a direct current to be imposed on the motor thereby braking the motor.

12. An electronic motor control according to claim 6 wherein the firing level of said Schmitt trigger is regulated by fluctuations in said power means so as to compensate for changes in the rate of rise of the ramp signal of said Schmitt trigger.

13. Apparatus for electronically braking an inductive AC motor comprising an AC power source to operate the motor, rectifier means to convert said AC power source to a source of DC power, a capacitor receiving a signal from said rectifier means, means to remove said AC power source from said motor, and switch means in parallel with said means to remove said AC power from said motor and imposing a DC signal on the motor, the duration of the DC signal being dictated by the time constant of said capacitor.

* * * * *